(12) United States Patent
Wu

(10) Patent No.: US 9,627,162 B1
(45) Date of Patent: Apr. 18, 2017

(54) FINGER ACTIVATED MOUSE DEVICE/SWITCHING DEVICE

(71) Applicant: Qiankun Wu, Moreno Valley, CA (US)

(72) Inventor: Qiankun Wu, Moreno Valley, CA (US)

( * ) Notice: Subject to any disclaimer, the term of this patent is extended or adjusted under 35 U.S.C. 154(b) by 0 days.

(21) Appl. No.: 15/280,029

(22) Filed: Sep. 29, 2016

Related U.S. Application Data

(63) Continuation of application No. 14/561,127, filed on Dec. 4, 2014.

(51) Int. Cl.
  *G06F 3/0346* (2013.01)
  *H01H 21/24* (2006.01)
  *H01H 21/04* (2006.01)
  *H01H 21/02* (2006.01)

(52) U.S. Cl.
  CPC .......... *H01H 21/24* (2013.01); *H01H 21/025* (2013.01); *H01H 21/04* (2013.01); *H01H 2221/016* (2013.01); *H01H 2221/036* (2013.01); *H01H 2235/006* (2013.01); *H01H 2239/074* (2013.01)

(58) Field of Classification Search
  CPC ...... H01H 21/24; H01H 21/025; G06F 3/033; G06F 3/0346
  USPC .......................................... 200/335; 345/163
  See application file for complete search history.

(56) References Cited

U.S. PATENT DOCUMENTS

| | | | | |
|---|---|---|---|---|
| 2011/0109552 | A1* | 5/2011 | Yasutake | G06F 3/03543 345/163 |
| 2011/0279371 | A1* | 11/2011 | Ma | G06F 3/03543 345/163 |
| 2012/0293414 | A1* | 11/2012 | Wang | G06F 3/03543 345/163 |

* cited by examiner

*Primary Examiner* — Edwin A. Leon
*Assistant Examiner* — Iman Malakooti
(74) *Attorney, Agent, or Firm* — Barry Choobin; Patent 360

(57) ABSTRACT

The embodiments herein show a switching device/mouse device activated by proximal phalanx of a finger(s). The switching device/mouse is ergonomically designed to prevent carpal-tunnel effect and bending of fingers. The switching device/mouse includes an enclosure having a top wall, a bottom wall, and sidewalls. The switching device/mouse includes an upper levers/elongated buttons pivotally supported by the top wall. The upper levers/elongated buttons are elevated surfaces to better support a user's fingers in a rest position. The mouse is operated by pressing down on the elevated surfaces of the upper levers with the proximal phalanx of the fingers without bending the fingers.

15 Claims, 7 Drawing Sheets

FINGER ACTIVATED MOUSE DEVICE/SWITCHING DEVICE

CROSS-REFERENCE TO RELATED APPLICATIONS

This application is a continuation in part of the Non-Provisional Patent application with Ser. No. 14/561,127 which claims priority of the Provisional Patent Application with Ser. No. 61/916,183 filed on Dec. 14, 2013, and the subsequent and the contents of which are included in entirety as reference herein.

BACKGROUND

Technical Field

The embodiments herein is generally related to a pointing device. The embodiments herein is particularly related to a finger activated mouse/switching device. The embodiments herein more particularly relate to a mouse/switching device that is activated using proximal phalanx based on back-press.

Description of the Related Art

In computing, a mouse is a pointing device that detects two-dimensional motion relative to a surface. This motion is typically translated into the motion of a pointer visible on a computer display, which allows for fine control of a graphical user interface. Physically, a mouse consists of an enclosure held in one's hand on the surface, and has one or more buttons, which is pressed by the fingers of the hand holding the mouse. Mice often feature other elements, such as touch surfaces and scroll wheels to provide additional control and dimensional input. Mouse buttons are usually micro switches, which are pressed to interact with an element of a graphical user interface, and produce a distinctive clicking sound. In a typical use scenario, after the pointer is positioned on screen by moving the mouse on the surface, a mouse button is pressed downwardly in a quick motion to enable a software enablement to invoke an expected computer action or result. Alternately, the button is pressed downwardly twice (or even three times) in quick succession to invoke an expected software driven response. In a still further embodiment of the traditional mouse, a button is pressed down and held down until an expected time related response is achieved. The three-button scroll mouse has become the most commonly available design.

The existing mouse generates a carpal-tunnel effect or syndrome on the users because the user tend to click the mouse with the tip of their fingers, thereby causing the fingers to bend. The existing designs of mouse cause pain in the palm since fingers need to be bent. Further, the existing mouse includes a rounded/elevated portion closer to the wrist side of the palm. The rounded/elevated portion in the existing mouse designs causes the muscles to restrain.

Hence, there exists a need for a mouse that eliminates pain caused in the fingers due to carpal-tunnel effect or syndrome. Furthermore, there exists need for a mouse that eliminates the rounded/elevated portion to prevent muscle strain. Still further, there exists a need for a finger-activated mouse that is operated with a back press operation using the finger areas other than the fingertips. Yet there exists a need for a finger-activated mouse that facilitates natural clicking operation.

The above-mentioned shortcomings, disadvantages and problems are addressed herein, which will be understood by reading and studying the following specification.

OBJECTS OF THE EMBODIMENTS

The primary object of the embodiments herein is to provide a finger-activated computer mouse/switching device operated by proximal phalanx of a finger.

Another object of the embodiments herein is to provide a finger activated switching device/mouse ergonomically designed to prevent carpal-tunnel effect or syndrome and bending of fingers.

Yet another object of the embodiments herein is to provide a finger-activated computer mouse/switching device that is operated with a back press operation using the finger areas other than the fingertips.

Yet another object of the embodiments herein is to provide a finger-activated computer mouse/switching device provided with upper levers/elongated buttons, switching elements, and restoring elements.

Yet another object of the embodiments herein is to provide a finger-activated computer mouse/switching device provided with upper levers/elongated buttons which are elevated surfaces so that the fingers rest in a relaxed position(s) on them.

These and other objects and advantages of the embodiments herein will become readily apparent from the following detailed description taken in conjunction with the accompanying drawings.

SUMMARY

The various embodiments herein disclose a switching device/mouse activated by proximal phalanx of a finger. The switching device/mouse is ergonomically designed to prevent carpal-tunnel effect and bending of fingers. The embodiments herein discloses a mouse/switching device including upper levers/elongated buttons with an elevated surface so that the user rests his fingers in a relaxed position on the elevated surfaces. The upper levers/elongated buttons includes elongated and elevated parts that go down when pressed anywhere on the elevated surfaces. Further, the mouse is back pressed with the proximal phalanx of the fingers without bending the fingers.

According to an embodiment herein, a finger activated mouse device/switching device is provided. The device comprises an enclosure having a top wall, a bottom wall, and a pair of opposing side walls. The upper levers/elongated buttons is pivotally supported on the top wall. The upper levers/elongated buttons is downwardly displaced from the top wall with a proximal phalanx of the finger. The upper levers/elongated buttons are attached to the top wall through support arms. A pair of restoring elements are positioned within the enclosure. The pair of restoring elements includes a first restoring element and a second restoring element. The first restoring element and the second restoring element is connected to the upper levers/elongated buttons. The first restoring element and the second restoring element are respectively configured to displace the upper levers/elongated buttons back to a home position or rest position after the completion of the displacement operation of the upper levers/elongated buttons. A pair of switching elements are positioned within the enclosure. The pair of switching elements include a first switching element and a second switching element. The first switching element and the second switching element is connected to the upper levers/elongated buttons. The first switching element and the second switching element are respectively activated, when the upper levers/elongated buttons is displaced downwardly. The upper levers/elongated buttons has an elevated surface to receive fingers of the user during a use condition. The upper levers/elongated buttons is configured to be operated with a proximal phalanx of the fingers.

According to an embodiment herein, the first switching element and the second switching element are respectively deactivated, when the upper levers/elongated buttons is moved to home position or rest position.

According to an embodiment herein, the first switching element and the second switching element are respectively activated to close an electrical circuit.

According to an embodiment herein, the first switching element and the second switching element are respectively deactivated to open an electrical circuit.

According to an embodiment herein, the first switching element and the second switching element are similar or of same type.

According to an embodiment herein, the first switching element and the second switching element are of different types.

According to an embodiment herein, the first rotating element and the second rotating element are springs.

According to an embodiment herein, the first rotating element and the second rotating element are fiber material.

According to an embodiment herein, the device further comprises a platform supported by a spring. The platform is tilted in a first direction to activate the first switching element and the second switching, when the upper levers/elongated buttons is displaced downwardly. According to an embodiment herein, the platform is connected to the first switching element through a first rod. The platform is connected to the second switching element through a second rod.

According to an embodiment herein, the first switching element is enclosed in a first block mounted on the bottom wall of the enclosure, and the second switching element is enclosed in a second block mounted on the bottom wall of the enclosure.

According to an embodiment herein, the device further comprises a scroll wheel attached in between the upper levers/elevated buttons/elongated buttons.

According to an embodiment herein, the upper levers/elongated buttons has two arms separated by a distance. The two arms includes a first arm and a second arm. The first arm and the second arm are displaced to carry out mutually different operations.

According to an embodiment herein, the upper wall is mounted with an illuminating unit to provide illumination or light during operation.

According to an embodiment herein, a switching device/mouse activated by proximal phalanx of a finger includes an enclosure having a top wall, a bottom wall, and sidewalls. The switching device/mouse includes upper levers/elongated buttons pivotally supported by the top wall. The upper levers/elongated buttons is downwardly displaced from the top wall with a proximal phalanx of the finger. The switching device/mouse includes a pair of restoring elements positioned within the enclosure and coupled to the upper levers/elongated buttons to reposition the upper levers/elongated buttons back to the rest position or home position, when the movement of the upper levers/elongated buttons is completed. Further, the switching device/mouse includes a pair of switching elements wherein the operation of the switching elements is carried out by the displacement of the upper levers/elongated buttons to perform an electrical switching operation. The mouse is held in the grasping grip such that a user's hand is in a positioned over the top wall during a rest position, and the user's finger is positioned on the elevated surface of the upper levers/elongated buttons during an operation of the upper levers/elongated buttons. The upper levers/elongated buttons is operated by back pressing operation with the proximal phalanx of the fingers without bending the fingers.

According to an embodiment herein, the switching device/mouse further includes a platform supported by a pivotable element. When the upper levers/elongated buttons is displaced downwardly, the pivotable element is tilted in a first direction for actuating a first switching element. The restoring elements are any one of springs, and material fibers.

According to an embodiment herein, an ergonomically designed computer mouse device activated by proximal phalanx of a finger includes an enclosure having a top wall, a bottom wall, and sidewalls. The computer mouse includes an upper levers/elongated buttons pivotally supported by the top wall. The upper levers/elongated buttons includes an elevated surface continuing to a contoured curve at the edge so that fingers rest in a relaxed position on the elevated surface. The upper level is displaced by pressing the curved edge with the proximal phalanx of the fingers. The computer mouse includes a scroll wheel positioned above the top wall. The mouse is held in the grasping grip such that a user's hand is in a received to rest over the top wall during a non-use condition. The device is operated by back pressing the upper levers/elongated buttons with the proximal phalanx of the fingers without having to bend the fingers.

According to an embodiment herein, a switching device/mouse activated by proximal phalanx of a finger includes an enclosure having a top wall and a bottom wall. The switching device/mouse includes a plurality of upper levers/elongated buttons arranged adjacent to one another. The upper levers/elongated buttons are pivotally supported by the top wall and spaced apart from the top wall during a non-use condition. The upper levers/elongated buttons is downwardly displaced with the proximal phalanx of the finger. The switching device/mouse includes a plurality of restoring elements positioned within the enclosure and coupled to the upper levers/elongated buttons to reposition the upper levers/elongated buttons back to home position or rest position, after the completion of displacement operation of the upper levers/elongated buttons. The restoring elements includes any one of springs of fiber materials. The switching device/mouse includes a plurality of switching elements. The upper levers/elongated buttons is displaced to activate the switching elements to carry out an electrical switching operation. The mouse is held in the grasping condition such that a user's hand is positioned over the top wall during a non-use condition. The user's finger is positioned on the elevated surface of the upper levers/elongated buttons to operate the upper levers/elongated buttons by a back pressing operation with the proximal phalanx of the fingers and without bending the fingers.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

BRIEF DESCRIPTION OF THE DRAWINGS

The other objects, features and advantages will occur to those skilled in the art from the following description of the preferred embodiment and the accompanying drawings in which.

Figure 1:
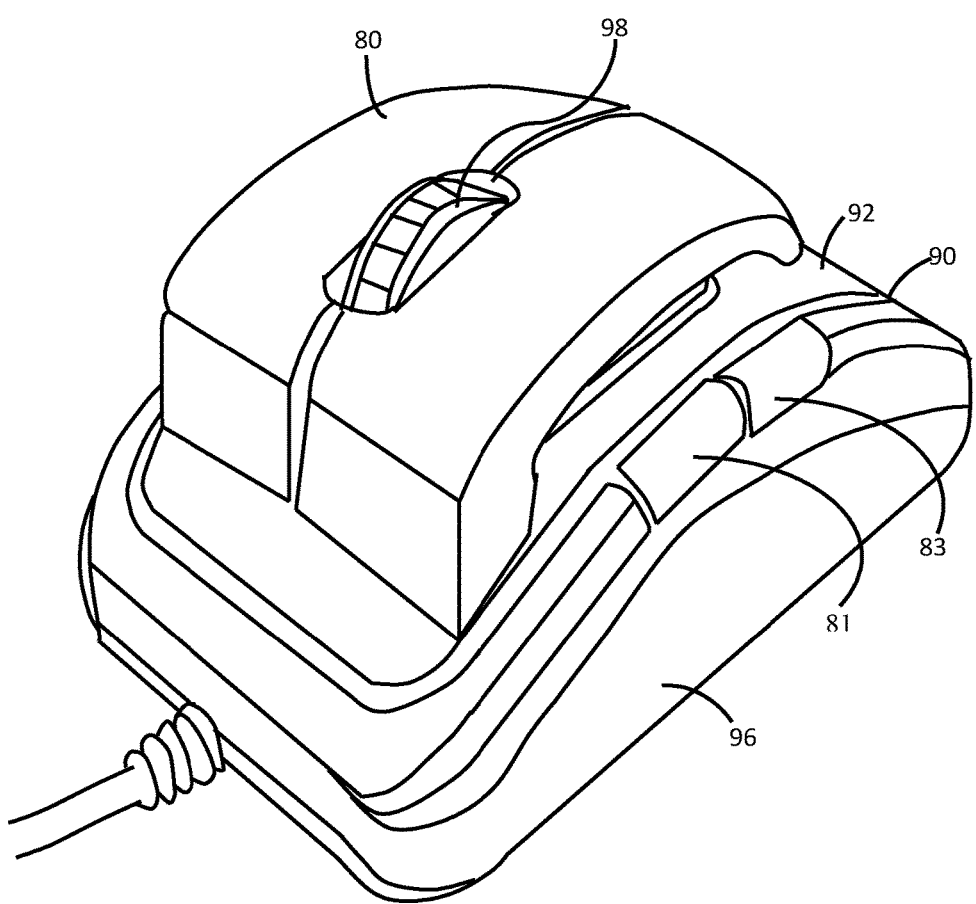
FIG. 1 illustrates a topside perspective side view of a mouse device, according to one embodiment herein.

Although the specific features of the embodiments herein are shown in some drawings and not in others. This is done for convenience only as each feature may be combined with any or all of the other features in accordance with the embodiments herein.

DETAILED DESCRIPTION OF THE EMBODIMENTS HEREIN

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that other changes may be made without departing from the scope of the embodiments. The following detailed description is therefore not to be taken in a limiting sense.

The various embodiments herein disclose a switching device/mouse activated by proximal phalanx of a finger. The switching device/mouse is ergonomically designed to prevent carpal-tunnel effect and bending of fingers. The embodiments herein discloses a mouse/switching device including upper levers/elongated buttons with an elevated surface so that the user rests his fingers in a relaxed position on the elevated surface. The upper levers/elongated buttons includes elongated and elevated parts that go down when pressed anywhere on the upper levers/elongated buttons. Further, the mouse is back pressed with the proximal phalanx of the fingers without bending the fingers.

According to an embodiment herein, a finger activated mouse device/switching device is provided. The device comprises an enclosure having a top wall, a bottom wall, and a pair of opposing side walls. The upper levers/elongated buttons is pivotally supported on the top wall. The upper levers/elongated buttons is downwardly displaced from the top wall with a proximal phalanx of the finger. The upper levers/elongated buttons is attached to the top wall through a support arm. A pair of restoring elements are positioned within the enclosure. The pair of restoring elements includes a first restoring element and a second restoring element. The first restoring element and the second restoring element is connected to the upper levers/elongated buttons. The first restoring element and the second restoring element are respectively configured to displace the upper levers back to a home position or rest position after the completion of the displacement operation of the upper levers/elongated buttons. A pair of switching elements are positioned within the enclosure. The pair of switching elements include a first switching element and a second switching element. The first switching element and the second switching element is connected to the upper levers/elongated buttons. The first switching element and the second switching element are respectively activated, when the upper levers/elongated buttons is displaced downwardly. The upper levers/elongated buttons has a top surface to receive fingers of the user during a use condition. The upper levers/elongated buttons is configured to be operated with a proximal phalanx of the fingers.

According to an embodiment herein, the first switching element and the second switching element are respectively deactivated, when the upper levers/elongated buttons is moved to home position or rest position.

According to an embodiment herein, the first switching element and the second switching element are respectively activated to close an electrical circuit.

According to an embodiment herein, the first switching element and the second switching element are respectively deactivated to open an electrical circuit.

According to an embodiment herein, the first switching element and the second switching element are similar or of same type.

According to an embodiment herein, the first switching element and the second switching element are of different types.

According to an embodiment herein, the first rotating element and the second rotating element are springs.

According to an embodiment herein, the first rotating element and the second rotating element are fiber material.

According to an embodiment herein, the device further comprises a platform supported by a spring. The platform is tilted in a first direction to activate the first switching element and the second switching, when the upper lever/elongated button is displaced downwardly. According to an embodiment herein, the platform is connected to the first switching element through a first rod. The platform is connected to the second switching element through a second rod.

According to an embodiment herein, the first switching element is enclosed in a first block mounted within wall of the enclosure, and the second switching element is enclosed in a second block mounted within wall of the enclosure.

According to an embodiment herein, the device further comprises a scroll wheel attached in between the upper levers/elongated buttons.

According to an embodiment herein, the upper levers/elongated buttons are two arms separated by a distance. The two arms includes a first arm and a second arm. The first arm and the second arm are displaced to carry out mutually different operations.

According to an embodiment herein, the upper wall is mounted with an illuminating unit to provide illumination or light during operation.

According to an embodiment herein, a switching device/mouse activated by proximal phalanx of a finger includes an enclosure having a top wall, a bottom wall, and sidewalls. The switching device/mouse includes an upper lever elongated button pivotally supported by the top wall. The upper lever/elongated button is downwardly displaced from the top wall with a proximal phalanx of the finger. The switching device/mouse includes a pair of restoring elements positioned within the enclosure and coupled to the upper levers/elongated buttons to reposition the upper levers/elongated buttons back to the rest position or home position, when the movement of the upper levers/elongated buttons is completed. Further, the switching device/mouse includes a pair of switching elements wherein the operation of the switching elements is carried out by the displacement of the upper levers/elongated buttons to perform an electrical switching operation. The mouse is held in the grasping grip such that a user's hand is in a positioned over the top wall during a rest position, and the user's finger is positioned on the elevated surface of the upper levers/elongated buttons during an operation of the upper levers/elongated buttons. The upper levers/elongated buttons is operated by back pressing operation with the proximal phalanx of the fingers without bending the fingers.

According to an embodiment herein, the switching device/mouse further includes a platform supported by a pivotable element. When the upper levers/elongated buttons is displaced downwardly, the pivotable element is tilted in a first direction for actuating a first switching element. The restoring elements are any one of springs, and material fibers.

According to an embodiment herein, an ergonomically designed computer mouse device activated by proximal phalanx of a finger includes an enclosure having a top wall, a bottom wall, and sidewalls. The computer mouse includes upper levers/elongated buttons pivotally supported by the top wall. The upper levers/elongated buttons includes an elevated surface continuing to a contoured curve at the edge so that fingers rest in a relaxed position on the elevated surface. The upper level is displaced by pressing the curved edge with the proximal phalanx of the fingers. The computer mouse includes a scroll wheel positioned on the top wall. The mouse is held in the grasping grip such that a user's hand is in a received to rest over the top wall during a non-use condition. The device is operated by back pressing the upper levers/elongated buttons with the proximal phalanx of the fingers without having to bend the fingers.

According to an embodiment herein, a switching device/mouse activated by proximal phalanx of a finger includes an enclosure having a top wall and a bottom wall. The switching device/mouse includes a plurality of upper levers/elongated buttons arranged adjacent to one another. The upper levers/elongated buttons are pivotally supported by the top wall and spaced apart from the top wall during a non-use condition. The upper levers/elongated buttons is downwardly displaced with the proximal phalanx of the finger. The switching device/mouse includes a plurality of restoring elements positioned within the enclosure and coupled to the upper levers/elongated buttons to reposition the upper levers/elongated buttons back to home position or rest position, after the completion of displacement operation of the upper levers/elongated buttons. The restoring elements includes any one of springs of fiber materials. The switching device/mouse includes a plurality of switching elements. The upper levers/elongated buttons is displaced to activate the switching elements to carry out an electrical switching operation. The mouse is held in the grasping condition such that a user's hand is positioned over the top wall during a non-use condition. The user's finger is positioned on the elevated surface of the upper levers/elongated buttons to operate the upper levers/elongated buttons by a back pressing operation with the proximal phalanx of the fingers and without bending the fingers.

Figure 2:
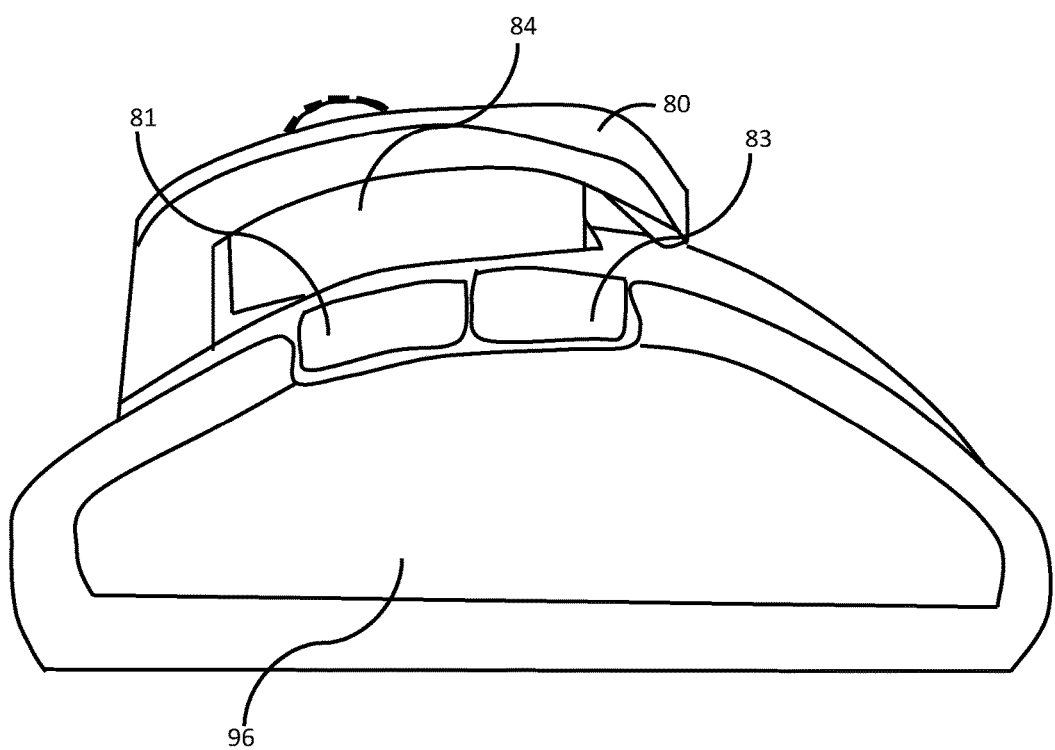
FIG. 2 illustrates a right side view of a mouse device, according to one embodiment herein.
Figure 3:
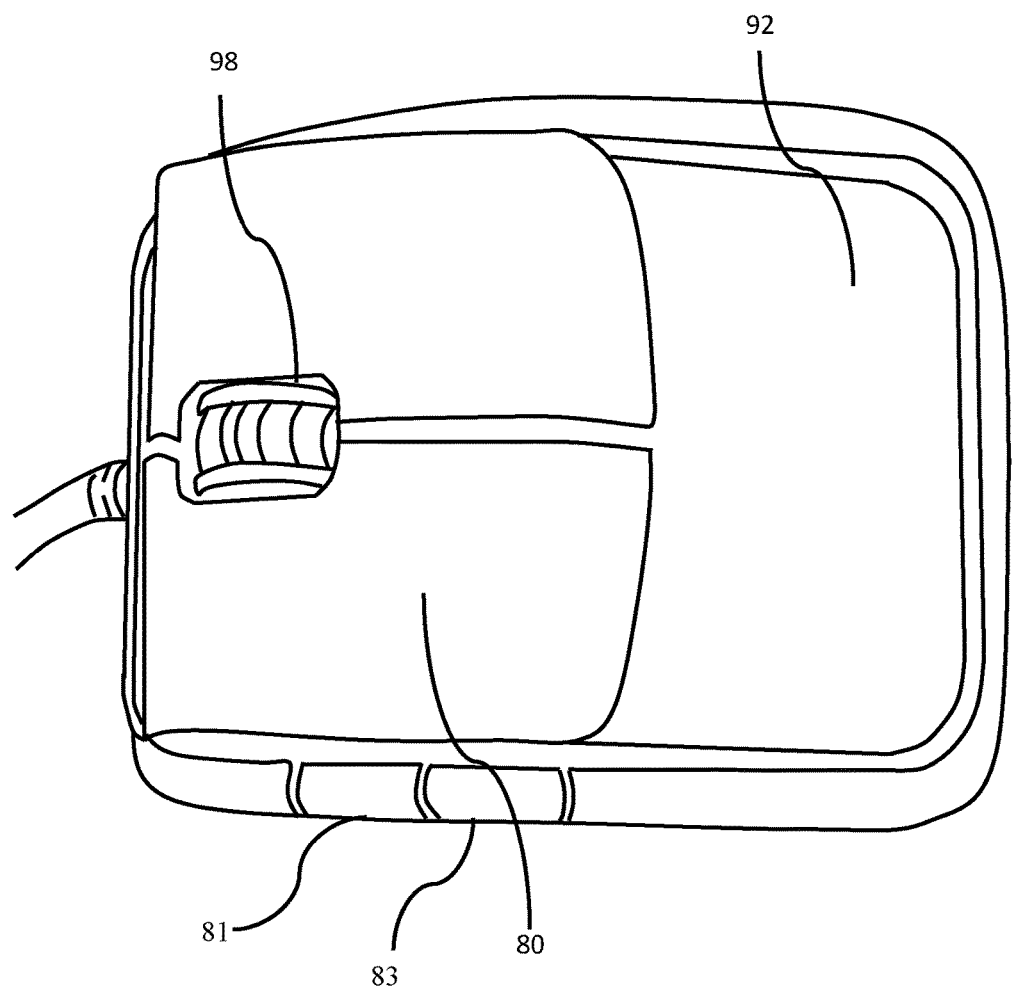
FIG. 3 illustrates a topside view of a mouse device, according to one embodiment herein.
Figure 4:
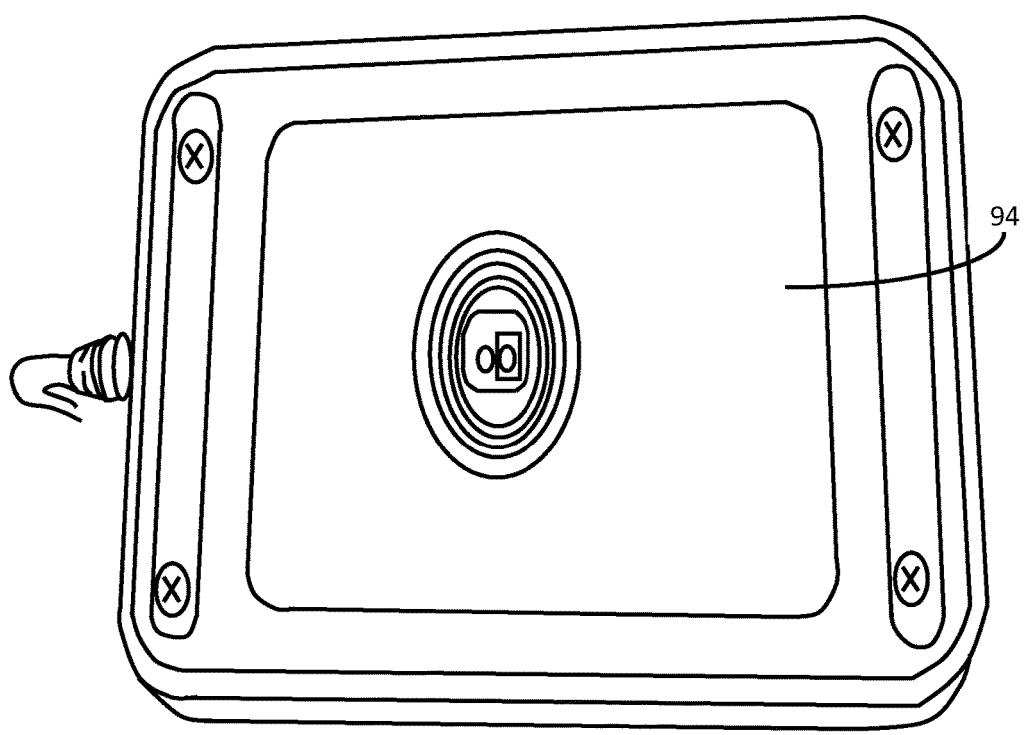
FIG. 4 illustrates a bottom side view of a mouse device, according to one embodiment herein.
Figure 5:
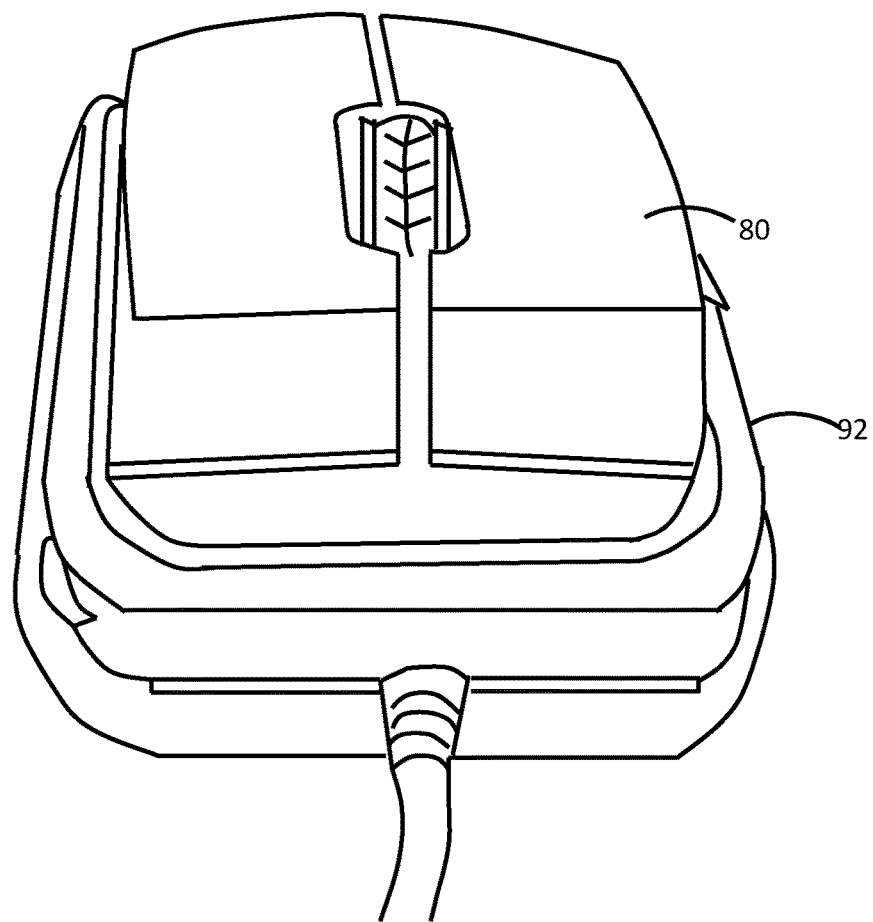
FIG. 5 illustrates a backside view of a mouse device, according to one embodiment herein.
Figure 6:
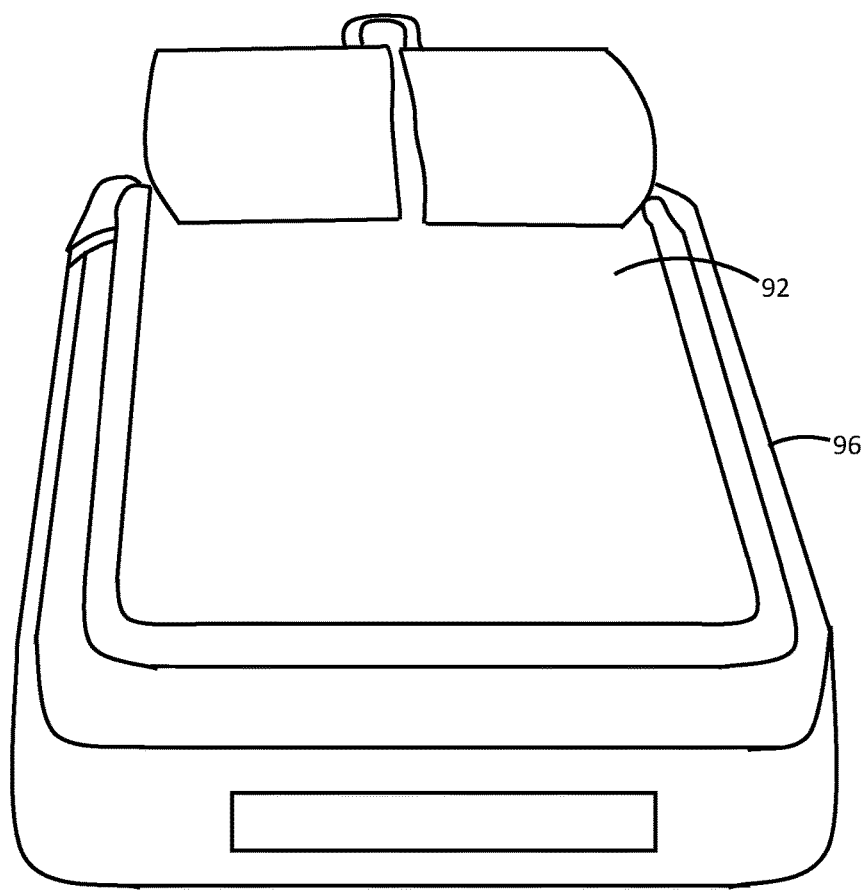
FIG. 6 illustrates a front side view of a mouse device, according to one embodiment herein.
Figure 7:
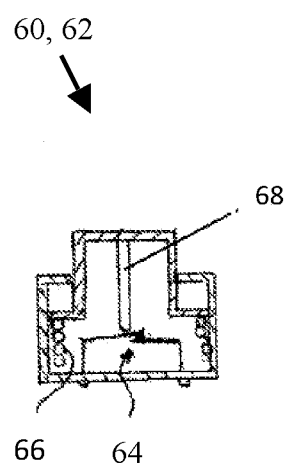
FIG. 7 illustrates a side view of a switching element in an activated condition to close an electrical circuit in the computer mouse device/switching device, according to an embodiment herein.
Figure 8:
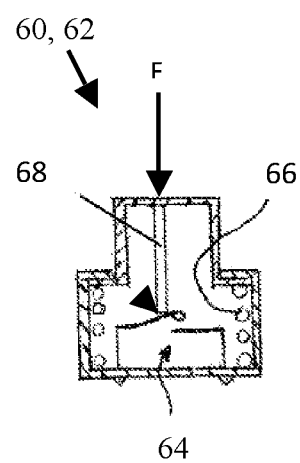
FIG. 8 illustrates a side view of a switching element in a non-activated condition to open an electrical circuit in the computer mouse device/switching device, according to an embodiment herein.

FIG. 1 illustrates a topside perspective side view of a mouse device, according to one embodiment herein. FIG. 2 illustrates a right side view of a mouse device, according to one embodiment herein. FIG. 3 illustrates a topside view of a mouse device, according to one embodiment herein. FIG. 4 illustrates a bottom side view of a mouse device, according to one embodiment herein. FIG. 5 illustrates a backside view of a mouse device, according to one embodiment herein. FIG. 6 illustrates a front side view of a mouse device, according to one embodiment herein. FIG. 7 illustrates a side view of a switching element in an activated condition to close an electrical circuit in the computer mouse device/switching device, according to an embodiment herein. FIG. 8 illustrates a side view of a switching element in a non-activated condition to open an electrical circuit in the computer mouse device/switching device, according to an embodiment herein. With respect to FIG. 1-FIG. 8, the ergonomically designed computer mouse 100 comprise an enclosure 70 which may be of molded plastic, for instance, and which further include a top wall 72 and a bottom wall 74. The bottom wall 74 is intended to be rested on and be moved over a supporting surface as is well known in the use of computer mice for computer visual screen operations. The enclosure 90 includes opposing side walls 96 so that walls 92, 94, and 96 form a closed enclosure 90 that is held in the grasping grip such that a user's hand is in a relaxed position over the top wall 92. The computer mouse includes a scroll wheel 98 positioned on the top wall 92.

With respect to FIGS. 1 to 8, an upper levers/elongated buttons 80 is supported by the enclosure 90 held by opposing standoffs 84, wherein the standoffs are attached at top wall 92 and extended downwardly therefrom, as shown. The upper levers/elongated buttons 80 is positioned above and separated from the top wall 92 and is displaced by a back press using proximal phalanx of a finger. Thus, the design enables the palm of the user to be in a relaxed position without the need for bending fingers. The computer mouse is ergonomically designed with an elevated front portion and low back portion, thereby enabling the user to position the hand in such a way that the palm rests straight on the top wall 92 of the switching device. Thus, the void of the palm is not filled with elevated portions as compared to other mouse designs. Further, the switching device includes buttons/micro switches '81' and '83' that is used for switching function.

According to an embodiment herein, a switching device/mouse activated by proximal phalanx of a finger includes an enclosure having a top wall and an opposing bottom wall. The switching device/mouse includes a plurality of mutually adjacent upper lever/elongated buttons. The upper levers/elongated buttons is pivotally supported by the top wall, and downwardly separated from the first rest positions. The upper levers/elongated buttons is downwardly displaced by the proximal phalanx of the finger. The mouse is held in the grasping grip such that a user's hand is in a relaxed position over the top wall, and the user's finger is positioned on the elevated surface of the upper levers/elongated buttons, and operated by back pressing with the proximal phalanx of the fingers without bending the fingers.

With respect to FIG. 7, the first switch 60 is in a non-actuated state whereby the electrical contacts 64 are kept open. As illustrated in FIG. 8, the first switch 60 with the electrical contacts 64 are in a closed position when force "F" is applied by pressure of proximal phalanx of the finger to the upper levers/elongated buttons 40. When finger pressure "F" is removed, the electrical contacts 64 is in open position as spring 66 is retreated upward to their non-compressed state, thereby resuming the upper levers/elongated buttons 40 to rest position.

According to an embodiment herein, the finger activated switching device (mouse 10) include two or more sets of levers 40, 50, for switching multiple sets of switching elements 60 and 62. A plurality of levers 40, 50 with the same mechanical arrangements for actuating more than two sets of switches 60, 62 is understood by those skilled in the art.

The improved ergonomic mouse/switching device configuration allows the palm of the user to be in a relaxed position without the need of bending fingers. The design feature facilitate the reduction of the load on the entire palm of the user, thereby minimizing the stain and stress of mouse usage. The switching device is ergonomically designed with an elevated front portion and low back portion, thereby enabling the user to position the hand in such a way that the palm rests straight on the top wall of the switching device. Thus, the void of the palm is not filled with elevated portions using the improved ergonomic mouse/switching device configuration, thereby preventing carpal-tunnel. The slope of the levers in the mouse/switching device is shaped to allow, a relaxed rather than an extended posture.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the invention with modifications. However, all such modifications are deemed to be within the scope of the claims.

It is also to be understood that the following claims are intended to cover all of the generic and specific features of the embodiments described herein and all the statements of the scope of the embodiments, which as a matter of language might be said to fall there between.

What is claimed is:

1. A finger activated mouse device/switching device comprising:
    an enclosure having a top wall, a bottom wall, and a pair of opposing side walls;
    a plurality of upper levers/elongated buttons pivotally supported on the top wall, and wherein the upper levers/elongated buttons is downwardly displaced from the top wall with a proximal phalanx of the finger, and wherein the plurality of upper levers/elongated buttons is attached on the top wall through at least one support arm;
    a pair of restoring elements positioned within the enclosure, and wherein the pair of restoring elements includes a first restoring element and a second restoring element, and wherein the first restoring element and the second restoring element are respectively connected to the plurality of upper levers/elongated buttons, and wherein the first restoring element and the second restoring element are respectively configured to displace the plurality of upper levers/elongated buttons back to a home position or rest position after the completion of the displacement operation of the plurality of upper levers/elongated buttons; and
    a pair of switching elements positioned within the enclosure, and wherein the pair of switching elements includes a first switching element and a second switching element, and wherein the first switching element and the second switching element are respectively connected to the plurality of upper levers/elongated buttons, and wherein the first switching element and the second switching element are respectively activated, when the plurality of upper levers/elongated buttons is displaced downwardly;
    an elevated surface arranged on the top wall, and wherein the elevated surface is designed and configured to receive a hand of a user during a non-use condition or non-operative condition of the mouse, and wherein the plurality of upper levers/elongated buttons is elevated to receive fingers of the user during a use condition, and wherein the plurality of upper levers/elongated buttons is configured to be operated with a proximal phalanx of the fingers, wherein said upper levers may or may not be connected to at lease said one support arm.

2. The device according to claim 1, wherein the first switching element and the second switching element are respectively deactivated, when the plurality of upper levers/elongated buttons is moved to home position or rest position.

3. The device according to claim 1, wherein the first switching element and the second switching element are respectively activated to close an electrical circuit.

4. The device according to claim 1, wherein the first switching element and the second switching element are respectively deactivated to open an electrical circuit.

5. The device according to claim 1, wherein the first switching element and the second switching element are similar or of same type.

6. The device according to claim 1, wherein the first switching element and the second switching element are of different types.

7. The device according to claim 1, wherein the first rotating element and the second rotating element are springs.

8. The device according to claim 1, wherein the first rotating element and the second rotating element are fiber material.

9. The device according to claim 1 further comprises a platform supported by a spring, and wherein the platform is tilted in a first direction to activate the first switching element, and the platform is tilted in a second direction to activate the second switching element when the plurality of upper levers/elongated buttons is displaced downwardly.

10. The device according to claim 1, wherein the platform is connected to the first switching element through a first rod and wherein the platform is connected to the second switching element through a second rod.

11. The device according to claim 1, wherein the first switching element is enclosed in a first block mounted on the bottom wall of the enclosure, and wherein the second switching element is enclosed in a second block mounted on the bottom wall of the enclosure.

12. The device according to claim 1, further comprises a scroll wheel attached in between the plurality of upper levers/elongated buttons.

13. The device according to claim 1, wherein the plurality upper levers/elongated buttons are two arms separated by a distance, and wherein the two arms includes a first arm and a second arm, and wherein the first arm and the second arm are displaced to carry out mutually different operations.

14. The device according to claim 1, wherein the upper wall is mounted with an illuminating unit to provide illumination or light during operation.

15. The device according to claim 1, wherein a pivot able element(s) shared or independently used by both upper levers wherein the downward movements of the upper levers correspondingly would actuate the first and second switching elements.

* * * * *